March 3, 1953  I. P. THUNELL  2,629,964

FISHERMAN'S KIT BOX

Filed April 24, 1950

INVENTOR

*Isaac P. Thunell*

Patented Mar. 3, 1953

2,629,964

UNITED STATES PATENT OFFICE 2,629,964

FISHERMAN'S KIT BOX

Isaac P. Thunell, Holladay, Utah

Application April 24, 1950, Serial No. 157,672

1 Claim. (Cl. 43—57.5)

This invention relates to a fisherman's kit box that will do away with cloth through which fish hooks are placed while carrying them in the box.

Another object of this invention is to provide a fisherman's kit box, in which the fish hook and leader can be held in tension in such a manner that they will not tangle with other fish hooks and leaders within the box.

With these and other objects in view, the invention consists of the novel features of construction, as hereinafter described and claimed.

In the accompanying drawing forming a part of this specification, in which corresponding parts are denoted by like reference characters, is illustrated the preferred form of the invention capable of carrying the same into practical use, it being understood that various changes in shape, proportions and general assemblage of its parts may be resorted to without departing from the principles of the invention or sacrificing any of its advantages, and the right is therefore reserved to make all changes and modifications which fairly fall within the scope of the invention and claim made therefor.

Referring to the drawing.

The invention comprises a box A having a tray B therein and a cover C.

The tray B has a pocket 12 therein for holding leaders, and other pockets 13 for holding dry flies.

Projecting upward from the bottom of the box A are posts 1 placed near the upper end D over which one part of a rubber band 18 is placed.

Figure 1:
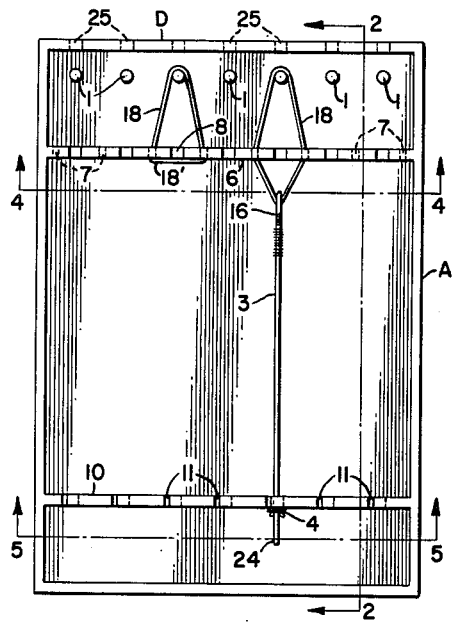
Figure 1 is a plan view of the box A with the tray B removed.
Figure 3:
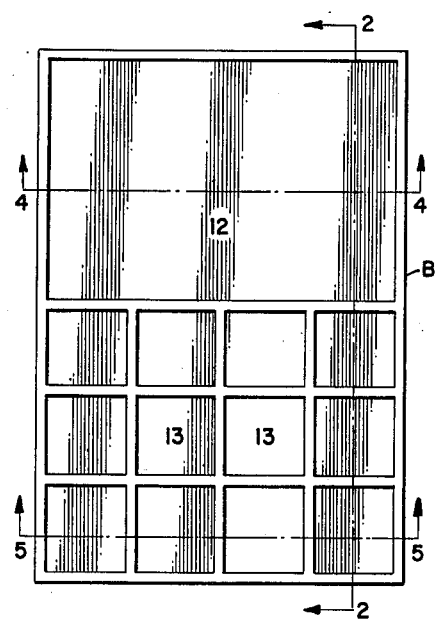
Fig. 3 is a plan view of the tray B.
Figure 2:
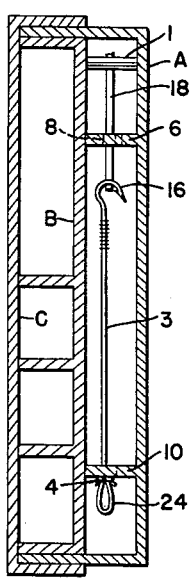
Fig. 2 is a sectional view on line 2—2, Figs. 1 and 3, showing box and tray combined.
Figure 4:
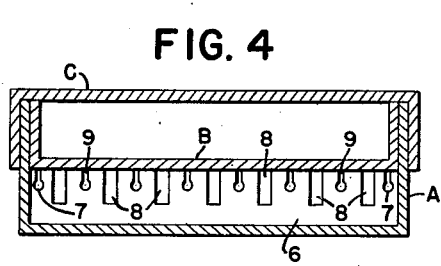
Fig. 4 is a sectional view of the upper end of box A and tray B on line 4—4, Figs. 1 and 3, showing the box and tray combined.
Figure 5:
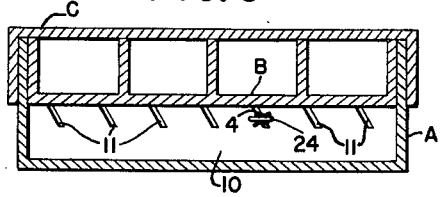
Fig. 5 is a sectional view of the lower end of box A and tray B on line 5—5, Figs. 1 and 3, showing box A and tray B combined.

Spaced away from the posts 1 is a partition 6 having apertures 7 and a notch 8 therein, a slit 9 extending from the apertures 7 to the upper face of the partition 6 into which the other part of the rubber band is placed and moved through to the apertures 7 on each side of the notch 8, see 18′, Fig. 1, so a fish hook 16 can be placed into the notch 8 and hooked over the rubber band 18.

In the lower end of the box A is placed another partition 10, having slits 11 therein into which the cat gut may be placed.

In the event that a post 1 would be broken off or the rubber band should be too long to fit over the post, I provide apertures 25 through the upper end D of the box so the band can be placed through the apertures and tied with a knot to keep it from being pulled through the aperture when tension is placed on the rubber band.

To keep the cat gut on the fish hooks from tangling with one another in the box, I use a rubber band 18, place one portion over the post 1, place the other portion through slits 11 into apertures 7 on each side of the notch 8 as shown at 18′, Fig. 1. I then take the end of the cat gut 3, which is attached to the hook 16, engage it on the rubber band as shown in Fig. 1, pull on it to give tension to the rubber band and place the other end of the cat gut in slits 11 with the knot 4 on the loop 24 against the lower wall of the partition 10, which will prevent the tension of the rubber band from pulling the cat gut out of the slit 11.

In the drawing I only show one fish hook in place in as much as all fish hooks are placed in the same manner.

Having thus described my invention what I claim as new and desire to secure by Letters Patent is:

A fisherman's kit box having posts therein, a partition adjacent one end of said box spaced away from said posts, said partition having apertures therein alternating with notches, each aperture having a slot extending therefrom to the upper edge of said partition, and a rubber band extending over a post into two adjacent apertures and passing across the notch between said adjacent apertures so that a fish hook can be hooked onto said band, said box having another partition near the opposite end of said box from said posts, and said other partition having slits therein in which the loop end of the cat gut of the fish hook may be held in place by the tension of the rubber band.

ISAAC P. THUNELL.

REFERENCES CITED

The following references are of record in the file of this patent:

UNITED STATES PATENTS

| Number | Name | Date |
|---|---|---|
| 435,094 | Hewitt | Aug. 26, 1890 |
| 595,998 | Garland | Dec. 21, 1897 |
| 639,454 | Smith | Dec. 19, 1899 |
| 742,040 | Kurtz | Oct. 20, 1903 |
| 2,069,661 | Tiede | Feb. 2, 1937 |
| 2,130,112 | Woolen | Sept. 13, 1938 |
| 2,156,740 | Schweigert | May 2, 1939 |
| 2,497,188 | Schindler | Feb. 14, 1950 |